United States Patent [19]

Popalis et al.

[11] Patent Number: 4,772,448
[45] Date of Patent: Sep. 20, 1988

[54] SUPPORT PIN SYSTEM AND LOCKING NUT RETAINER

[75] Inventors: Craig H. Popalis; Ronald J. Hopkins; John T. Land; Franklin D. Obermeyer, all of Pensacola, Fla.

[73] Assignee: Westinghouse Electric Corp., Pittsburgh, Pa.

[21] Appl. No.: 816,782

[22] Filed: Jan. 7, 1986

[51] Int. Cl.⁴ .......................................... G21C 19/00
[52] U.S. Cl. .................................. 376/463; 376/353; 411/113; 411/121; 411/335
[58] Field of Search ...................... 376/463, 353, 310; 411/333, 334, 335, 336, 103, 111, 112, 113, 121, 122, 123, 124

[56] References Cited

U.S. PATENT DOCUMENTS

| | | |
|---|---|---|
| 374,274 | 6/1887 | Schapiro . |
| 498,834 | 6/1893 | Woods . |
| 803,310 | 10/1905 | Smith . |
| 890,339 | 6/1908 | Cooper . |
| 925,067 | 6/1909 | Zeese . |
| 976,928 | 11/1910 | Salisbury . |
| 1,254,726 | 1/1918 | Portee . |
| 1,272,584 | 7/1918 | Warne . |
| 1,320,962 | 11/1919 | Andrix . |
| 1,363,210 | 12/1920 | Alexander . |
| 1,369,332 | 2/1921 | Elliott . |
| 1,410,812 | 3/1922 | Joberty . |
| 1,431,459 | 10/1922 | Hardie . |
| 1,582,094 | 4/1926 | Sweet . |
| 1,595,026 | 8/1926 | Sherman . |
| 2,374,241 | 4/1945 | Simmonds . |
| 2,395,234 | 2/1946 | Schlueter . |
| 3,322,636 | 5/1967 | Benson . |
| 3,997,394 | 12/1976 | Aisch et al. . |
| 4,139,315 | 2/1979 | Levy et al. . |
| 4,166,313 | 9/1979 | Walton . |
| 4,173,513 | 11/1979 | Obermey et al. . |
| 4,231,843 | 11/1980 | Myron et al. . |
| 4,323,428 | 4/1982 | Schallenberger et al. . |
| 4,326,921 | 4/1982 | Cadwell . |
| 4,585,613 | 4/1986 | Styskal et al. . |

FOREIGN PATENT DOCUMENTS

| | | |
|---|---|---|
| 0130840 | 1/1985 | European Pat. Off. . |
| 954580 | 6/1949 | France . |
| 2265151 | 10/1975 | France . |
| 2319956 | 2/1977 | France . |
| 2326763 | 4/1977 | France . |
| 2374547 | 7/1978 | France . |
| 2399715 | 3/1979 | France . |
| 2531563 | 2/1984 | France . |
| 468629 | 7/1937 | United Kingdom ................ 411/124 |
| 913407 | 12/1962 | United Kingdom . |
| 2076580 | 12/1981 | United Kingdom . |

OTHER PUBLICATIONS

Nuclear Engineering International, vol. 29, No. 362, Nov. 1984, pp. 29-33.
Gulcherd, Laurent, "Dealing With Control Rod Guide Tube Support Pin Cracking", N.E.I., Nov. 1984, pp. 29-33.

Primary Examiner—John F. Terapane
Assistant Examiner—John S. Maples

[57] ABSTRACT

A support pin system which is a non-welded system for fastening a first structural member, such as a nuclear reactor control rod guide tube flange, to a second structural member, such as nuclear reactor upper core plate, includes a support pin and nut. A first pin portion passes through the first member and has a threaded section which mates with the nut. A second pin portion has a solid body section and a split-leaf base section which biasingly engages a bore in the second member. The solid body section is accommodated by a close clearance fit. The split-leaf base section has an intermediate diameter which is less than the diameter of the solid body section. Thus, loads applied transversely to the system are reacted substantially in pure shear through the solid body section. The nut may be a locking nut having a crimpable cylindrical section integrally connected to an internally threaded section. The crimpable section is crimped to engage recesses provided in the pin whereby relative rotation therebetween is positively prevented. A locking nut retainer may optionally be provided for positively retaining the nut in position around the support pin which has a crimpable split cylindrical wall portion and an axial slot, and tabs. The retainer is compressed for insertion into a bore in a structural member, the bore having an annular recess for accommodating the tabs whereby the retainer is positively retained in the structural member and the wall portion is crimped to engage the nut.

24 Claims, 2 Drawing Sheets

SUPPORT PIN SYSTEM AND LOCKING NUT RETAINER

BACKGROUND OF THE INVENTION

1. Field of the Invention

The present invention relates generally to a support pin system which is a non-welded mechanical system and, more particularly, to a novel support pin system which may include a novel locking nut and/or a novel locking nut retainer, for utilization especially in connection with nuclear reactor control rod guide tubes to fixedly secure the control rod guide tubes by means of their annular flanged portions to the upper surface of the upper core plate of the reactor by means of such a nonwelded mechanical system.

2. Description of the Prior Art

Support pin systems for fastening a first structural member to a second structural member by means of a support pin and nut are utilized in applications requiring a non-welded mechanical system, such as the support pin system for fastening a nuclear reactor control rod guide tube to a nuclear reactor upper core plate flange whereby control rod guide tubes are secured in the upper reactor internals between the upper core plate and an upper support plate. Within a nuclear reactor, as is well known, the upper boundary of the reactor core is defined by means of an upper core plate. The upper ends of the nuclear reactor core fuel assemblies are connected to the under surface of the upper core plate, as shown, for example, in U.S. Pat. No. 4,173,153 to Obermeyer et al, the disclosure of which is herein incorporated by reference. Each fuel assembly has fuel rods and has defined therein numerous locations within which nuclear reactor control rods are capable of being disposed for regulating the power output of the fuel assemblies and the reactor core. Protection for the control rods is provided, with respect to the crosscurrents of the flowing nuclear reactor core coolant, through means of guide tubes which are interposed between and fixedly connected to, the upper surface of the upper core plate and an upper support plate which is disposed above and vertically spaced from the upper core plate.

The guide tubes are provided with annular flanges at the lower ends thereof and guide tube support pins fixedly interconnect the guide tube flanges to the upper core plate. The vertically disposed guide tube support pins have split-leaf lower portions which are disposed within and frictionally engage suitable bores within the upper core plate, and upper bolt portions which pass through through-bores provided in the guide tube flange and threadedly engage suitable, internally threaded nuts. Counter-bored portions of the guide tube flange are generally retained between an annular shoulder portion of the support pin shank and the mated nut. In order to prevent the retrograde rotation of the nut relative to the support pin whereby the nut may possibly become disengaged from the threaded portion of the guide tube support pin, a dowel pin is conventionally passed through the nut and the exposed ends welded to support pin locking tabs.

While the aforenoted conventional locking system is entirely satisfactory when the various components of the nuclear reactor system are initially installed prior to commencement of plant operations, once plant operations have commenced, and the support pins require repair or replacement, for example, due to failures as a result of stress corrosion cracking problems, repair or replacement of the aforenoted welded-type dowel pin locking system cannot be simply effectuated in view of the fact that such welding operations must now be performed remotely in order to protect maintenance personnel from radiation exposure within the irradiated environment, and the operations must also be performed in a spacially restricted or confined underwater environment. Further, welding to secure the nut to the support pin, whether performed directly or indirectly by means of the aforementioned dowel pin and tab system, is disadvantageous. The welding heat adversely affects the pre-load of the nut torqued onto the support pin, which preload provides resistance to flow-induced vibration. Further, structural material adjacent to the welded area may be adversely affected, the welding heat tending to promote subsequent corrosion and stress cracking of the affected materials.

A dual crimp locking system has been disclosed in the copending, commonly-assigned, U.S. patent application Ser. No. 576,645 by J. T. Land et al, filed on Feb. 3rd, 1984, the disclosure of which is herein incorporated by reference. A support pin having a split-leaf base section, an externally threaded, upper bolt portion and a top end portion provided with vertical grooves is disclosed in which the grooved top end protrudes through a securing nut threaded onto the upper bolt portion. The nut is provided with vertical splines and the locking system is secured by means of a stepped tubular cap which is crimped into place around both the top end portion of the support pin and the securing nut whereby retrograde rotation between the support pin and nut is positively prevented. Such a fastening arrangement, however, depends for its efficacy on the structural integrity of the crimped cap, i.e., the stepped tubular cap, as well as that of the support pin. The structural configuration of these support pins, however, subjects them to both high shank preload stresses and to high bending loads and stress corrosion cracking and shearing, especially of the shank portion above the annular shoulder, has been observed, especially for the heretofor preferred Inconel-750 material. The affected nuclear reactor guide tube is thus left without a properly secured support.

Moreover, the longevity of the nuclear reactor as a whole may be seriously compromised by dislodged parts which may be propelled through the system by the swiftly flowing nuclear reactor core coolant and damage other power plant components, such as the steam generator. When the shanks of conventional support pins shear under the combined influence of the high preload and high bending stresses, the upper bolt portion of the support pin, along with the attached nut and/or crimped cap, may subsequently dislodge under the influence of the coolant flow. The nut, crimped cap or dowel pin, etc., may also disengage. The split leaf base section and/or one or more of the leaves may disengage, all with deleterious result. Further, all presently-known guide tube support pin and locking systems have one or more of the above recited disadvantages.

Accordingly, it is an object of the present invention to provide a new and improved support pin system, which is a non-welded mechanical system, and is useful especially in connection with nuclear reactor control rod guide tubes.

It is another object of the present invention to provide a locking nut retainer for positively retaining a nut in position around an elongate threaded element when the retainer is positioned within and accommodated by a structural member having the elongate threaded element disposed therein, such as for positively retaining a nut in position around a support pin for fastening a nuclear reactor control rod guide tube flange to a nuclear reactor upper core plate.

It is yet another object of the present invention to provide a locking nut for positively preventing relative rotation of the nut when threadedly engaged to an elongate threaded element, which locking nut may be used in the above support pin system and/or may be used in conjunction with the above locking nut retainer.

SUMMARY OF THE INVENTION

The foregoing and other objectives are achieved in accordance with the present invention through the provision of a new and improved support pin system for fastening a first structural member having a through-bore defined therethrough to a second structural member having a bore defined therein, which system includes a support pin having a longitudinal axis, a first pin portion and a second pin portion, the first pin portion being disposed within and passing through the through-bore and having an externally threaded section, and the second pin portion being fixedly secured within the bore and having a solid body section and a split-leaf base section, the solid body section having an outer diameter which is accommodated by the bore by a close clearance fit, the split-leaf base section having a split intermediate section which extends from the solid body section and has an outer diameter which is less than the outer diameter of the solid body section, and a split end section which extends from the split intermediate section and biasingly engages at least a portion of the wall of the bore, whereby the support pin is fixedly secured within the second structural member by a frictional fit and whereby loads applied transversely to the longitudinal axis of the support pin are reacted substantially in pure shear by the second pin portion substantially through the solid body section; and nut means having an internally threaded section which threadedly engages the externally threaded section of the first pin portion and cooperates therewith, whereby the first structural member is retained between the nut means and the solid body section of the support pin.

The first pin portion of the support pin system may further include an end section positioned remotely from the second pin section and having a plurality of recesses, preferably longitudinal recesses, provided on the external surface thereof. When the nut means is a locking nut and further comprises a crimpable cylindrical section, which crimpable cylindrical section extends from and is integrally connected to the internally threaded section and crimpingly engages at least one, but preferably at least two, most preferably at least four, of the plurality of recesses of the support pin in use, relative rotation between the locking nut and the support pin is positively prevented.

The support pin system may further encompass a locking nut retainer which includes a split cylindrical wall portion which is crimpable and has an axial slot defined therein; and tabe means which extends radially from the wall portion and is positioned along the external surface thereof. The locking nut retainer is positioned around at least a portion of the nut means. When the first structural member is provided with a counter-bore having an annular recess radially defined in the wall thereof, the counter-bore accommodates at least the portion of the wall portion of the locking nut retainer which includes the tab means, the tab means is positioned within the annular recess, and the locking nut retainer is positively retained in the first structural member. Further, when the nut means further comprises a crimp receiving section which has at least one recess provided in the external surface thereof, at least a portion of the wall portion of the locking nut retainer crimpingly engages the at least one recess and the nut means is positively retained in position around the support pin and relative rotation therebetween is positively prevented. The nut means may be the aforementioned locking nut.

In the above described support pin system, the first structural member may be a nuclear reactor control rod guide tube flange and the second structural member may be a nuclear reactor upper core plate.

The foregoing and other objectives may be further achieved in accordance with the present invention through the provision of a locking nut retainer. A locking nut retainer, adapted to be positioned within and accommodated by a structural member, such as a nuclear reactor upper core plate, having an elongate threaded element disposed therein for positively retaining a nut in position around the elongate threaded element, includes a split cylindrical wall portion which is crimpable and has an axial slot defined therein whereby the locking nut retainer is rendered substantially resiliently compressible along the radial axis thereof for insertion thereof during use. The wall portion is adapted to be positioned around the external periphery of the nut and to crimpingly engage at least a portion of the periphery of the nut in use. The locking nut retainer also includes tab means extending radially from the wall portion along the external surface thereof. The structural member is provided with a bore for accommodating the locking nut retainer and the elongate threaded element, and the bore has an annular recess defined therein for accommodating the tab means. Thus, the locking nut retainer is positively retained in the structural member and the nut is positively retained around the elongate threaded element when crimpingly engaged by the locking nut retainer.

In a preferred locking nut retainer embodiment, the tab means is a pair of tabs positioned opposite one another, equidistant from the axial slot of the wall portion, and the nut has a plurality of splines and a plurality of spline grooves positioned along the external surface thereof, the splines being alternatingly associated with the spline grooves. The wall portion of the locking nut retainer crimpingly engages at least two spline grooves in use. Most preferably, two spline grooves are crimpingly engaged in use, the engaged spline grooves being spaced 144° apart.

BRIEF DESCRIPTION OF THE DRAWINGS

Various other objects, features, and attendant advantages of the present invention will be more fully appreciated as the same becomes better understood from the following detailed description when considered in connection with the accompanying drawing, in which.

DESCRIPTION OF THE PREFERRED EMBODIMENTS

Figure 1:
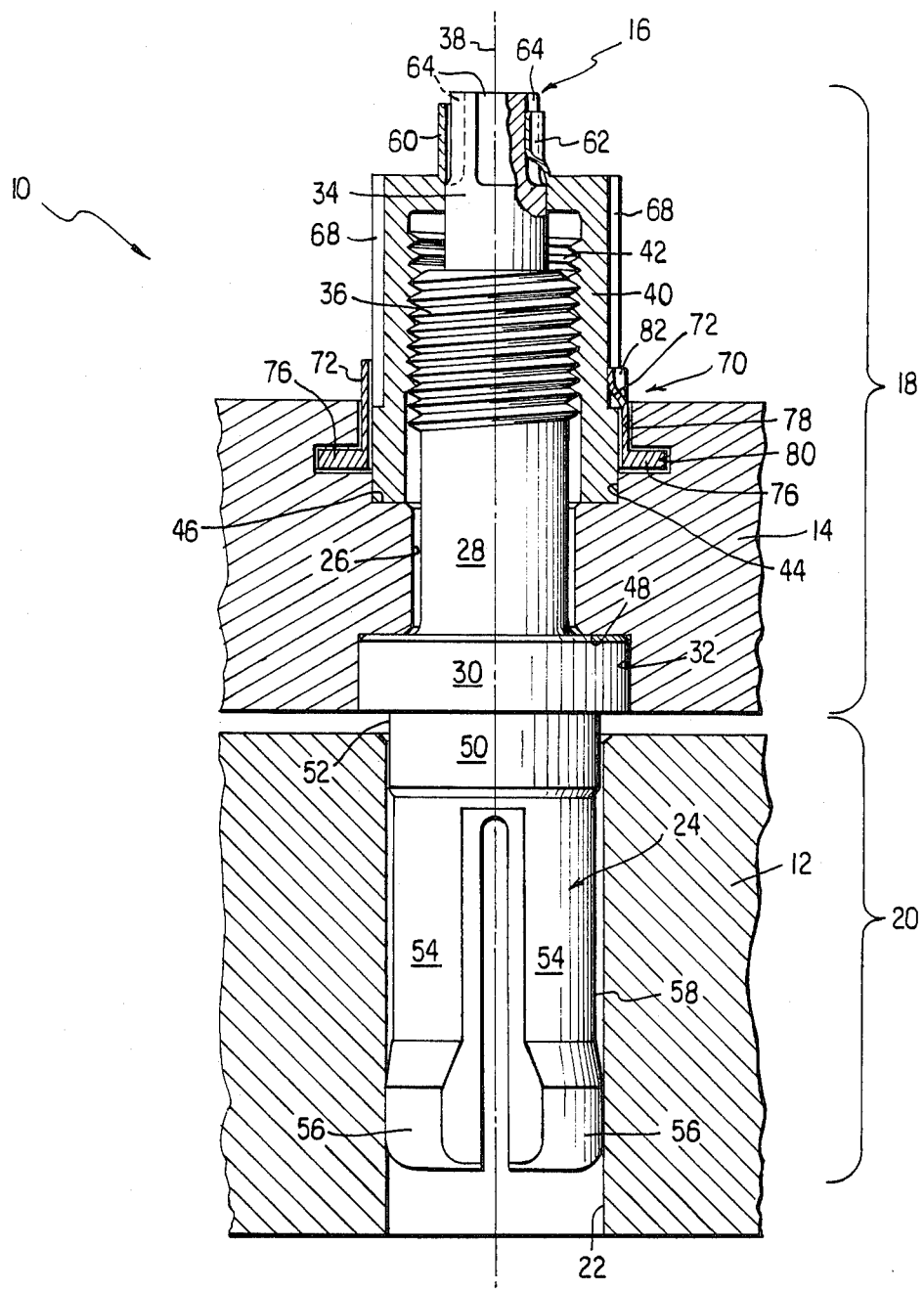
FIG. 1 is an elevational side view, partly in cross-section, of a support pin system according to the present invention, which includes a vertically disposed support pin, a locking nut and a locking nut retainer.

The present invention provides a support pin system which is a non-welded mechanical system. A novel support pin and a nut are provided for fastening a first structural member to a second structural member. A first pin portion passes through a through-bore in the first structural member and has a threaded section which mates with the nut. A second pin portion has a solid body section and a split-base section, which split-base section biasingly engages a bore provided in the second structural member. The solid body section is accommodated by the bore by a close clearance fit. The split-leaf base section has an intermediate section with an outer diameter which is less than the outer diameter of the solid body section. Thus, loads applied transversely to the longitudinal axis of the support pins system are reacted substantially in pure shear through the solid body section of the support pin. By reacting the transverse loads substantially in this manner, rather than through the bending moment of the leaves of the pin, the bending loads on the pin are substantially reduced and the bending stresses are substantially relieved in areas of the pin where stress corrosion cracking has occurred in prior art pins.

When the support pin system is used to fasten a nuclear reactor control rod guide tube flange to a nuclear reactor upper core plate, the support pin system preferably includes a locking nut rather than a simple securing nut such as an hexagonal nut or a spline nut. The locking nut crimpingly engages longitudinal recesses provided in the free end of the support pin, thereby positively preventing relative rotation of the nut about the pin. According to the present invention a novel locking nut is provided which has a crimpable cylindrical section integrally connected to an internally threaded section. The integral connection may be achieved by integrally machining the part or by joining the two elements in any of the well known manners, such as by brazing or welding. The nut is coaxially inserted about the support pin and threadedly engaged onto a mating threaded section of the support pin. For nuclear reactor use, the nut is torqued to a predetermined preload and the crimpable section of the nut is crimped to engage the recesses provided in the support pin, whereby relative rotation therebetween is positively prevented. Preferably the recesses are longitudinal recesses. The integral structure of the present locking nut overcomes the prior art requirement for a separate crimped cap and/or dowel pin, and thereby reduces the possible number of small parts which could be dislodged in the event of a failure of one or more components of the support pin system.

A support pin system for nuclear reactor use preferably has a support pin fabricated from a nickel based alloy, most preferably strain-hardened 316 stainless steel which is highly resistant to stress corrosion cracking unlike the previously used Inconel-750. Such cold worked 316 staqinless steel has an excellent operating history in reactor internals applications. The preferred material for the novel, integral locking nut according to the present invention is 304 stainless steel.

The present invention also provides a locking nut retainer which is a modified bolt locking cap and which may be used to positively retain virtually any nut in position about an elongate threaded element when the structural member having the elongate threaded element disposed therein can be provided with a counterbore having an annular recess therein for accommodating the present locking nut retainer. Thus, the present invention contemplates a locking nut retainer adapted to be positioned within and accommodated by a structural member having an elongate threaded element disposed therein for positively retaining a nut in position around the elongate threaded element once the two are matingly engaged.

A split cylindrical wall portion which is crimpable and has an axial slot defined therein is provided to render the retainer substantially resiliently compressible along the radial axis thereof to allow for insertion of the retainer into the bore and annular recess provided in the structural member. The retainer is provided with tabs extending radially from the cylindrical wall portion along the external surface thereof. The retainer is positionable within the bore and the tabs are accommodated by the annular recess. The crimpable split cylindrical wall portion of the retainer crimpingly engages the external periphery of the nut in use whereby the nut is positively retained around the elongate threaded element and the locking nut retainer is positively retained in the structural member. At least one crimp, preferably at least two crimps, are provided for this purpose.

The present invention further provides a locking nut which is adapted to be coaxially positioned in threaded engagement with an elongate threaded element, such as the novel support pin of the present invention, and to crimpingly engage same in use. The locking nut features an internally threaded section which threadedly engages the elongate threaded element in use. Integrally connected to the internally threaded section is a crimpable cylindrical section which extends coaxially therefrom. Thus, when the elongate threaded element is provided with an end section having a plurality of recesses, preferably longitudinal recesses, on the external surface thereof, at least one, but preferably at least two, of the recesses are crimpingly engaged by the crimpable cylindrical section of the locking nut. Such engagement positively prevents relative rotation of the nut about the elongate threaded element and is useful in many applications requiring a mechanical joining system, which can be installed without welding and removed with relative ease, albeit by the probable destruction of the locking nut, such as for the fastening of a nuclear reactor control rod guide tube flange to a nuclear reactor upper core plate.

The invention can be better understood by referring to FIG. 1, an elevational side view, partly in cross-section, of a new and improved support pin system constructed in accordance with the present invention, as generally indicated by the reference character 10. The cooperative parts of support pin system 10 are shown, for example, as being used in a nuclear reactor power plant for securing control rod guide tubes to upper core plate 12, the previously referred to second structural member. The support pin system 10 may be installed ab initio or may be retrofitted when an existing conventional guide tube support pin system requires repair or replacement due to failure under, for example, stress corrosion cracking conditions. The vertically positioned control rod guide tubes are secured to the upper core plate 12 through means of annular guide tube flanges 14, the previously referred to first structural member, one flange 14 formed about the lower periphery of each guide tube. In order to interconnect the guide tube flange 14 to the upper core plate 12, a plurality of vertically disposed support pins 16 are utilized, only one such pin 16 being shown substantially in full view. The support pin orientation here is vertical, however, any orientation would be within the scope of the invention. Pins 16 are disposed in a circumferential array within the annular guide tube flange 14, usually in pairs. An upper or first pin portion 18 is disposed within the guide tube flange 14 and a lower or second pin portion 20 is disposed within the upper core plate 12.

In order to accommodate the dispostion of the support pins 16, the upper surface of the upper core plate 12 is provided, at each locus of a support pin 16, with a bore 22 within which a lower, split-leaf base section 24 of the support pin is adapted to be frictionally inserted and retained in a biased engagement. The bore 22 is shown as a through-bore however, in some applications it may be a blind bore, whereby the split leaves are retained therewithin should they shear. The guide tube flange 14 is provided, at each locus of a support pin 16, with a throughbore 26 for accommodating an intermediate shank portion 28 of the support pin 16, and it is further seen that the shank portion 28 and base section 24 of support pin 16 are integrally connected by means of an annular shoulder 30. A lower counter-bore 32 (a second counter-bore 32) is defined within the lower surface of the guide tube flange 14, in the surface thereof proximate to the upper core plate 12, so as to be coaxially or concentrically disposed with respect to the guide tube flange through-bore 26, and in this manner, the support pin annular shoulder 30 is appropriately accommodated and seated within the lower surface of the guide tube flange 14.

The first pin portion 18 of the support pin 16 has an end section 34 and an externally threaded section 36. The upper end section 34 of the support pin 16 projects vertically upwardly and axially outwardly from the guide tube flange through-bore 26, along longitudinal axis 38 and is adapted to be threadedly mated with an annular, axially elongated, internally threaded, securing nut 40. Internally threaded section 42 of the nut 40 threadedly engages the externally threaded section 36 of the support pin 16. The nut 40 fixedly retains the guide tube flange 14 in its mounted mode upon each support pin 16, and therefore fixedly secures or fastens the flange 14 of the nuclear reactor control rod guide tube upon the upper core plate 12.

In order to properly accommodate the securing nut 40 upon the threaded section 36 of the support pin 16, the upper surface of guide tube flange 14, the surface thereof remote from the upper core plate 12, is provided at each location of a support pin 16, with an upper counter-bore 44 (a first counter-bore 44) which is co-axially or concentrically defined with respect to flange through-bore 26 and the lower counter-bore 32. An annular floor surface 46 is thus defined within the guide tube flange 14 upon which the lower face of securing nut 40 is engaged and seated in a manner similar to the engagement and seating of the support pin annular shoulder 30 upon an annular ceiling surface 48 of guide tube flange lower counter-bore 32. In this manner, when the securing nut 40 is threadedly engaged upon the externally threaded section 36 of the support pin 16, the guide tube flange 14 will be securely retained between the securing nut 40 and the support pin 16 by means of the engaged seating of the lower end of the nut 40 upon the annular floor surface 46 of flange 14, as well as by means of the engaged seating of the support pin annular portion 30 upon the annular ceiling surface 48 of the guide tube flange 14.

With continuing reference to FIG. 1, extending downwardly from annular shoulder 30 of the first pin portion 18 is a solid body section 50 of the second pin portion 20. The solid body portion 50 has an outer diameter 52 which is accommodated by the core plate bore 22 by a close clearance fit. The split-leaf base section 24 extends from the solid body section 50 and has a split intermediate section 54 which extends from the solid body section 50 and terminates in a split end section 56. The split end section 56 biasingly engages at least a portion of the wall of the core plate bore 22, whereby the support pin 16 is fixedly secured within the upper core plate 12 by a frictional fit. However, the split intermediate section 54 has an outer diameter 58 which is less than the outer diameter 52 of the solid body section 50 so that split intermediate section 54 does not engage the wall of the bore 22. Thus, the split-leaf base section 24 frictionally engages the bore 22 at the split end sections 56, but not along the split intermediate sections 54.

This arrangement allows loads applied transversely to the longitudinal axis 38 of the support pin 16 to be reacted substantially in pure shear by the second pin portion 20 substantially through the solid body section 50. Thus, the prior art support pin tendency to undergo stress cracking and shearing in the intermediate shank portion 28 of the support pin 16 is no longer a problem because the present structure minimizes the bending stress on the intermediate shank portion 28 by restricting bending of support pin 16 along its length by means of the close clearance fit provided between the solid body section 50 and the walls of the core plate bore 22.

Prior art support pins were frequently susceptible to stress cracking corrosion in the crotch portion where the split intermediate section joined the solid body section. The prior art stress cracking corrosion and shearing tendencies of prior art support pin resulted from structural designs, such as that disclosed in the previously referred to U.S. patent application Ser. No. 576,645 by J. T. Land et al. Such prior art support pins had solid body sections and split intermediate sections having the same outside diameter so that applied loads reacted in bending as well as in shear and machining tolerances could be more relaxed to accommodate misalignments since the prior art configurations did not provide a close clearance fit. The present support pin 16 accommodates misalignments by increasing the length especially of the second pin portion 20. The present support pin 16 is also preferably provided with a solid body section 50 having an outer diameter 52 which is greater than outer diameter 58 of the intermediate shank portion 28 of the upper or first pin portion 18, for additional strength when loads are reacted in shear therethrough.

With continuing reference to FIG. 1 and by way of example, when the guide tube flange 14 is approximately 3.81 cm thick and the upper core plate 12 is approximately 5.72 cm thick, the support pin 16 is advantageously about 13.34 cm in length. The bore 22 provided in upper core plate 12 is a through-bore and accommodates the second pin portion 20 which has a length of 5.72 cm. Further, the outer diameter 58 of the intermediate shank portion 28 is approximately 1.80 cm, the outer diameter of the annular shoulder 30 is 3.38 cm, the outer diameter of the solid body section 50 is 2.69 cm, the total outer diameter of the split intermediate section 54 is 2.54 cm and the total outer diameter of the split-leaf section 56 in its free state is 2.72 cm. The diameter of the core plate bore 22 is 2.70 cm such that a close clearance fit of 0.013 cm exists between the core plate bore 22 and the solid body section 50, but a clearance of 0.165 cm exists between the split intermediate section 54 and the core plate bore 22.

With continuing reference to FIG. 1, securing or locking nut 40 has an internally threaded section 42 and a crimpable cylindrical section 60 extending from and integrally connected to the internally threaded section 42. The internally threaded section 42 threadedly engages the externally threaded section 36 of the first pin portion 18 of the support pin 16. Threaded sections 42, 36 cooperate to retain the guide tube flange 14 between the locking nut 40 and the annular shoulder 30. In an alternate embodiment without an annular shoulder 30 (not shown), the guide tube flange 14 could be retained between the locking nut 40 and the solid body section 50 of the second pin portion 20 of the support pin 16.

Once the locking nut 40 has been threadedly engaged upon the threaded section 36 of the support pin 16, and appropriately torqued to a pre-determined load limit or value, it is of course desirable to insure the fact that the pin and nut assembly 16, 40 remains intact in their assembled state so as to, in turn, insure the fact that the guide tube flange 14, and therefore the nuclear reactor control rod guide tube, remains positionally fixed with respect to the nuclear reactor upper core plate 12. As seen in FIG. 1, the uppermost end section 34 of support pin 16 above the threaded section 36 thereof is provided with a plurality of recesses 64, which are shown in FIG. 1 as longitudinally or axially extending longitudinal recesses 64, which are equiangularly spaced about the support pin 16 at 90° intervals and serve as crimp receiving sections or grooves. For some modifications, the recesses need not be longitudinal, although longitudinal recesses are preferred herein. The upper end section 34 of the support pin 16 passes through the coaxially aligned crimpable cylindrical section 60 of the nut 40, and once the nut and pin assembly 16, 40 is fully threadedly engaged and the predetermined torque load value or limit has been attained, then crimps 62 are made by pressing upon and deforming portions of crimpable cylindrical section 60 into crimp receiving sections or longitudinal recesses 64 of the support pin 16. The thickness of the crimpable cylindrical section 60 is approximately 0.051 cm, for example. Although FIG. 1 shows crimp 62 opposed by an uncrimped but crimpable section 60, in practice, diametrically opposed crimps 62, 62 are formed by simultaneously pressing from opposite directions, so as to operatively engage two diametrically opposed longitudinal recesses 64 formed upon the upper end section 34 of support pin 16. Four longitudinal recesses 64 are indicated in FIG. 1, therefore two diametrically opposed crimps can be formed. This crimping operation must of course be performed in situ at the location sites of the support pins 16. In view of this requirement, these crimping operations will be performed by means of suitable, remotely controlled tools, not shown, whereby such crimping operations may be performed in an irradiated underwater environment without exposing maintenance personnel to the irradiated environment when support pin system 10 is retrofitted in an operating nuclear reactor.

Figure 2:
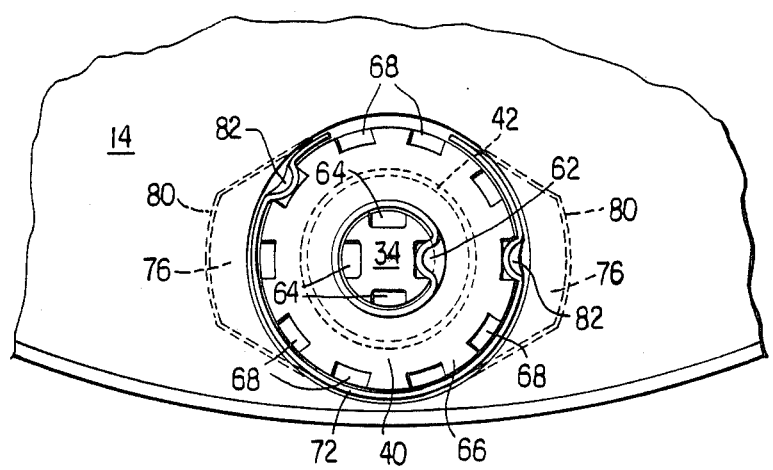
FIG. 2 is a plan top view of a portion of the annular flange of a nuclear reactor control rod guide tube including the support pin system of FIG. 1.

Spacial restrictions frequently do not permit use of an hexagonal nut since an hexagonal torque wrench cannot be positioned about the nut structure in an annular, 360° mode so as to impart the necessary torque to the securing nut. Accordingly, pursuant to the present invention, the locking nut 40 is shown in FIGS. 1 and 2 as a spline nut and is provided with ten, vertically oriented splines 66 defined within the external surface thereof in a circumferential array and alternatingly associated with adjacent spline grooves 68. In this manner, a suitable splined torque tool, not shown, can axially engage the locked nut splines 66, and once engaged, rotational torque applied thereto. Due to the aforenoted spacial constraints and restrictions of the use environment, the splined torquing tool need not engage the locking nut 40 in a complete 360° annular relationship as would be true of a conventional external hexagonal torque wrench. In particular, the external splined torque wrench may engage the locking nut splines 66 over a circumferentially extending arcuate area of less than 180°, and the splined torque wrench stroke may be, for example, 36°.

Figure 3:
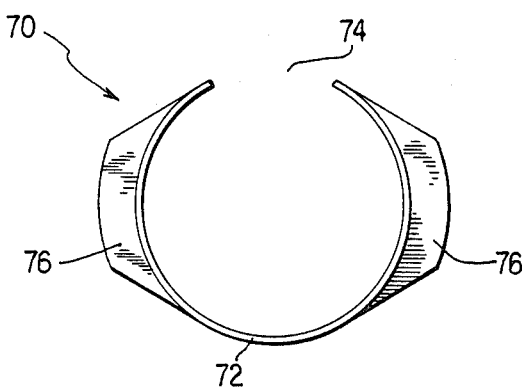
FIG. 3 is a plan top view of a locking nut retainer according to the present invention and as included in the support pin system of FIG. 1.

Also shown in FIG. 1 is a locking nut retainer shown generally at 70 and having a split cylindrical wall portion 72 which is crimpable and has an axial slot 74 defined therein, as shown in FIG. 3, a plan top view. Tabs 76 extend radially from the wall portion 72 and are positioned along the external surface thereof as shown in FIGS. 1 and 3. The locking nut retainer 70 is positioned around the locking nut 40 and extends upwardly along at least a portion of nut 40 as shown in FIG. 1.

The locking nut retainer is accommodated by and positively retained in use by guide tube flange 14. The top surface of guide tube flange 14, remote from the upper core plate 12, is provided with a retainer counter-bore 78, which counter-bore 78 has an annular recess 80 radially defined in the wall thereof. Counter-bore 78 may be the same as upper counter-bore 44 or may have a slightly greater diameter as shown in FIG. 1. The axial slot 74 of the locking nut retainer 70 renders same substantially resiliently compressible along the radial axis thereof to facilitate insertion of the retainer 70 during use. Locking nut retainer 70 is compressed to reduce the effective diameter thereof and is positioned within counter-bore 78. The tabs 76 are accommodated by annular recess 80, and when the compressive force on the locking nut retainer 70 is released, retainer 70 resiliently returns substantially to its original size, or may be so adjusted, and is retained positively within guide tube flange 14.

After the locking nut 40 has been torqued, the split cylindrical wall portion 72, which is crimpable, is crimpingly connected to the locking nut 40. The crimp receiving sections of locking nut 40 are the spline grooves 68. At least one crimp and preferably at least two crimps are formed by pressing sections of the split cylindrical wall portion 72 into respective adjacent spline grooves, whereby the locking nut retainer 70 is positively retained in position around support pin 16. The thickness of the split cylindrical wall portion is approximately 0.051 cm. Two crimps 82 are shown engaging spline grooves 68 in FIG. 2 and are spaced 144° apart. The axial slot 74 and tabs 76 suggest this preferred spacing, however, any number of crimps 82 could be formed with any degree of angular separation depending on the degree of fastening desired and the type of locking nut 40 used for the particular application. Should locking nut 40 disengage itself from a support pin 16, such as in the event of a failure of all of the crimps 62, or should the support pin 16 shear under stress, locking nut retainer 70 retains these dislodged components in place and the nuclear reactor system is protected thereby. Such a damaged support pin system 10 clearly needs to be replaced, however, and repair and replacement are facilitated by the non-welded system according to the present invention. Further, such locking nut retainers 70 need not be used in combination with a locking nut 40, but may themselves be retrofitted onto any of the conventional prior art support pin systems, such as those using a nut with a separate dual crimp cap.

It will be understood that the above description of the present invention is susceptible to various modifications, changes and adaptations, and the same are intended to be comprehended within the meaning and range of equivalents of the appended claims.

We claim:

1. A locking nut adapted to be coaxially positioned in threaded engagement with an elongate threaded element and to crimpingly engage same in use, said locking nut having sidewalls and having no external apertures in said sidewalls and comprising:
    an internally threaded section which threadedly engages said elongate threaded element in use; and
    a crimpable cylindrical section integrally connected to said internally threaded section and extending from the outermost portion of said internally threaded section,
    wherein said elongate threaded element comprises an end section having a plurality of recesses provided on the external surface thereof, whereby relative rotation between said locking nut and said elongate threaded element is positively prevented when at least one of said plurality.

2. The locking nut according to claim 1, wherein said plurality of recesses are longitudinal recesses.

3. A support pin system for fastening a first structural member having a through-bore defined therethrough to a second structural member having a bore defined therein, said support pin system comprising:
    a support pin having a longitudinal axis, a first pin portion and a second pin portion, said first pin portion being disposed within and passing through said through-bore and having an externally threaded section, and said second pin portion being fixedly secured within said bore and having a solid body section and a split-leaf base section, said solid body section having an outer diameter which is accommodated by said bore by a close clearance fit, said splitleaf base section having a split intermediate section which extends from said solid body section and has an outer diameter which is less than the outer diameter of said solid body section, and a split end section which extends from said split intermediate section and biasingly engages at least a portion of the wall of said bore, whereby said support pin is fixedly secured within said second structural member by a frictional fit and whereby loads applied transversely to said longitudinal axis of said support pin are reacted substantially in pure shear by said second pin portion substantially through said solid body section; and
    nut means having an internally threaded section which threadedly engages said externally threaded section of said first pin portion and cooperates therewith, whereby said first structural member is retained between said nut means and said solid body section of said support pin,
    wherein said first pin portion further comprises an end section positioned remotely from said second pin portion, adjacent said externally threaded section, and having a plurality of recesses provided on the external surface thereof; and
    wherein said nut means is a locking nut having sidewalls and having no external apertures in said sidewalls and further comprises a crimpable cylindrical section, which crimpable cylindrical section is integrally connected to said internally threaded section, extends from the outermost portion of said internally threaded section, and crimpingly engages at least one of said plurality of recesses of said support pin in use, whereby relative rotation between said locking nut and said support pin is positively prevented.

4. In combination with a nuclear reactor, a support pin system as defined in claim 3 wherein said first structural member is a nuclear reactor control rod guide tube flange and said second structural member is a nuclear reactor upper core plate.

5. A support pin system according to claim 3,
    wherein said first structural member is further provided with a second counter-bore in the surface thereof proximate to said second structural member; and
    wherein said first pin portion further comprises an annular shoulder which is adapted to be seated in said second counter-bore, and which merges with said solid body section of said second pin portion, whereby said first structural member is retained between said nut means and said annular shoulder.

6. The support pin system according to claim 3,
    wherein said first structural member further comprises a first counter-bore in the surface thereof remote from said second structural member; and
    wherein said nut means is seated within said first counter-bore.

7. The support pin system according to claim 3,
    wherein said plurality of recesses are longitudinal recesses.

8. The support pin system according claim 3,
    wherein said first structural member is a nuclear reactor control rod guide tube flange and said second structural member is a nuclear reactor upper core plate.

9. Support pin system according to claim 3,
    further comprising a locking nut retainer which includes a split cylindrical wall portion which is crimpable and has an axial slot defined therein; and tab means which extends radially from said wall portion and is positioned along the external surface thereof, said locking nut retainer being positioned around at least a portion of said nut;
    wherein said first structural member is provided with a first countyer-bore in the surface thereof remote from said second structural member, said first counter-bore having an annular recess radially defined in the wall thereof for accommodating at least the portion of said wall portion of said locking nut retainer which includes said tab means, and wherein said tab means is positioned within said annular recess, whereby said locking nut retainer is positively retained in said first structural member; and
    wherein said locking nut further comprises a crimp receiving section, at least a portion of said wall portion of said locking nut retainer crimpingly engaging said crimp receiving section, whereby said nut is positively retained in position around said support pin and relative rotation therebetween is positively presented.

10. The support pin system according to claim 9, wherein said first counter-bore further receives at least a portion of said locking nut.

11. The support pin system according to claim 9, wherein said plurality of recesses are longitudinal recesses.

12. The support pin system according to claim 9, wherein said nut means is a spline nut and said at least one recess is a plurality of spline grooves.

13. The support pin system according to claim 9, wherein said tab means is a pair of tabs positioned opposite one another and equidistant from said axisl slot of said wall portion,
wherein said nut has a plurality of splines and a plurality of spline grooves positioned along the external surface thereof, said splines being alternatingly associated with said spline grooves, and
wherein said wall portion of said locking nut retainer crimpingly engages at least two said spline grooves in use.

14. The support pin system according to claim 13, wherein said locking nut retainer crimpingly engages two said spline grooves in use, said engaged spline grooves being spaced 144° apart.

15. A support pin system for fastening a first structural member having a through-bore defined therethrough to a second structural member having a bore defined therein, said support pin system comprising:
a support pin having a longitudinal axis, a first pin portion and a second pin portion, said first pin portion being disposed within and passing through said through-bore and having an externally threaded section, and said second pin portion being fixedly secured within said bore and having a solid body section and a split-leaf base section, said solid body section having an outer diameter which is accommodated by said bore by a close clearance fit, said split-leaf base section having a split intermediate section which extends from said solid body section and has an outer diameter which is less than the outer diameter of said solid body section, and a split end section which extends from said split intermediate section and biasingly engages at least a portion of the wall of said bore, whereby said support pin is fixedly secured within said second structural member by a frictional fit and whereby loads applied transversely to said longitudinal axis of said support pin are reacted substantially in pure shear by said second pin portion substantially through said solid body section;
nut means having an internally threaded section which threadedly engages said externally threaded section of said first pin portion and cooperates therewith, whereby said first structural member is retained between said nut means and said solid body section of said support pin; and
a locking nut retainer which includes a split cylindrical wall portion which is crimpable and has an axial slot defined therein; and tab means which extends radially from said wall portion and is positioned along the external surface thereof, said locking nut retainer being positioned around at least a portion of said nut means;
wherein said first structural member is provided with a first counter-bore in the surface thereof remote from said second structural member, said first counter-bore having an annular recess radially defined in the wall thereof and said first counter-bore accomodating at least said wall portion of said locking nut retainer, and wherein said tab means is positioned within said annular recess, whereby said locking nut retainer is positively retained in said first structural member; and
wherein said nut means further comprises a crimp receiving section which has at least one recess provided in the external surface thereof, at least a portion of said wall portion of said locking nut retainer crimpingly engaging said at least one recess, whereby said nut means is positively retained in position around said support pin.

16. The support pin system according to claim 3, wherein said first counter-bore further receives at least a portion of said nut means.

17. The support pin system according to claim 15, wherein said at least one recess is a longitudinal recess or recesses.

18. The support pin system according to claim 15, wherein said nut means is a spline nut and said at least one recess is a plurality of spline grooves.

19. The support pin system according to claim 15, wherein said tab means is a pair of tabs positioned opposite one another and equidistant from said axial slot of said wall portion,
wherein said nut has a plurality of splines and a plurality of spline grooves positioned along the external surface thereof, said splines being alternatingly associated with said spline grooves, and
wherein said wall portion of said locking nut retainer crimpingly engages at least two said spline grooves in use.

20. The support pin system according to claim 19, wherein said locking nut retainer crimpingly engages two said spline grooves in use, said engaged spline grooves being spaced 144° apart.

21. A locking nut retainer adapted to be positioned within and accommodated by a structural member having an elongate threaded element disposed therein for positively retaining a nut in position around said elongate threaded element, said locking nut retainer comprising:
a split cylindrical wall portion which is crimpable and has an axial slot defined therein whereby said locking nut retainer is rendered substantially resiliently compressible along the radial axis thereof for insertion thereof during use, said wall portion being adapted to be positioned around the external periphery of said nut and to crimpingly engage at least a portion of the periphery of said nut in use; and
tab means extending radially from said wall portion along the external surface thereof,
wherein said structural member is provided with a counter-bore for accommodating at least said locking nut retainer and said elongate threaded element, said counterbore having an annular recess defined therein for accommodating said tab means, whereby said locking nut retainer is positively retained in said structural member and said nut is positively retained around said elongate threaded element when crimpingly engaged by said locking nut retainer.

22. The locking nut retainer according to claim 21, wherein said tab means is a pair of tabs positioned opposite one another and equidistant from said axial slot of said wall portion.

23. The locking nut retainer according to claim 21, wherein said nut has a plurality of splines and a plurality of spline grooves positioned along the external surface thereof, said splines being alternatingly associated with said spline grooves, and
wherein said wall portion of said locking nut retainer crimpingly engages at least two said spline grooves in use.

24. The locking nut retainer according to claim 23, wherein said locking nut retainer crimpingly engages two said spline grooves in use, said engaged spline grooves being spaced 144° apart.

* * * * *